United States Patent
Haake

[19]

[11] Patent Number: 6,101,884

[45] Date of Patent: Aug. 15, 2000

[54] FASTENER EQUIPPED WITH AN UNTETHERED FIBER-OPTIC STRAIN GAUGE AND RELATED METHOD OF USING THE SAME

[75] Inventor: John M. Haake, St. Charles, Mo.

[73] Assignee: McDonnell Douglas Corporation, St. Louis, Mo.

[21] Appl. No.: 08/835,743

[22] Filed: Apr. 10, 1997

[51] Int. Cl.$^7$ .................................................. G01B 9/02
[52] U.S. Cl. ................................................................ 73/800
[58] Field of Search ........................... 73/800, 761, 767, 73/768, 774, 785, 802, 805, 826; 356/35.5, 355, 356, 357, 358

[56] References Cited

U.S. PATENT DOCUMENTS

| | | | |
|---|---|---|---|
| 3,718,065 | 2/1973 | Liber | 85/62 |
| 3,823,639 | 7/1974 | Liber | 85/62 |
| 3,987,668 | 10/1976 | Popenoe | 73/800 |
| 4,041,776 | 8/1977 | Payne | 73/800 |
| 4,295,377 | 10/1981 | Couchman | 73/761 |
| 4,363,242 | 12/1982 | Heyman | 73/761 |
| 4,668,093 | 5/1987 | Cahill | 356/345 |
| 4,676,109 | 6/1987 | Wallace | 73/761 |
| 5,118,956 | 6/1992 | Dunning et al. | 250/561 |
| 5,276,501 | 1/1994 | McClintock et al. | 356/352 |
| 5,367,583 | 11/1994 | Sirkis | 385/12 |
| 5,451,772 | 9/1995 | Narendran | 250/227.19 |
| 5,452,087 | 9/1995 | Taylor et al. | 356/352 |
| 5,477,323 | 12/1995 | Andrews et al. | 356/345 |
| 5,488,475 | 1/1996 | Friebele et al. | 356/352 |
| 5,519,486 | 5/1996 | Baird et al. | 356/35.5 |
| 5,523,867 | 6/1996 | Putnam et al. | 356/345 |
| 5,570,437 | 10/1996 | Kluth et al. | 73/800 |
| 5,633,467 | 5/1997 | Paulson | 73/800 |
| 5,945,665 | 8/1999 | Hay | 73/800 |

OTHER PUBLICATIONS

"Under Pressure", Article Appearing in *Automobile* Magazine, Dec. 1996, p. 23.

White–Light Interferometric Multimode Fiber–Optic Sensor Optics Letters, pp. 78–80 (1993).

FISO Technologies Product Literature, 4 Sheets, Date Unknown.

Fiso Technologies News, Nov. 1, 1994.

Fiso Technologies News, May 1, 1995.

Smart Skins A Step Toward A Practical Fibre_Optic Sensor No date.

*Primary Examiner*—George Dombroske
*Attorney, Agent, or Firm*—Westerlund & Powell, P.C.; Robert A. Westerlund; Ramon R. Hoch

[57] ABSTRACT

A method for measuring strain on a structure having a bore and an untethered fiber-optic strain gauge embedded in the bore, which includes the steps of inserting a coupler portion of a fiber-optic cable into the bore in operative relationship to the fiber-optic strain gauge, and using an optical cavity length measurement device attached to the distal end of the fiber-optic cable to measure the strain on the structure. The coupler portion of the fiber-optic cable is removed from the bore after the strain on the structure has been measured. In an illustrative embodiment, the structure is a fastener, e.g., a rivet, used to join together the aluminum skin and the airframe of an aircraft, the bore being provided coincident with the central, longitudinal axis of the rivet.

17 Claims, 1 Drawing Sheet

FASTENER EQUIPPED WITH AN UNTETHERED FIBER-OPTIC STRAIN GAUGE AND RELATED METHOD OF USING THE SAME

BACKGROUND OF THE INVENTION

The present invention relates generally to the field of strain measurement devices for fasteners, such as rivets, bolts, and screws, and, more particularly, to a fastener equipped with an untethered fiber-optic strain gauge which is adapted to be coupled to a fiber-optic cable, and a related method of using the same.

There are presently available many different types of sensors and gauges for measuring the strain on fasteners used in mechanical structures in order to monitor the condition thereof. Electrical resistance (or mechanical) strain gauges can be utilized by field personnel to periodically measure the strain on fasteners used in structures subject to deterioration due to corrosion, fatigue, and other sources of mechanical stresses which induce strain. Although such measurements may be scheduled to be taken at regular service intervals, problems may develop between service intervals which go undetected. Further, such measurements are prone to human error, thereby resulting in undetected problems. Moreover, the cost of such servicing over the life of the structure can be very high.

In the case of certain structures, such as military or commercial aircraft, the failure of critical fasteners, e.g., rivets which are used to attach the "skin" to the airframe and to hold the airframe together, can have catastrophic consequences, including the loss of life and of the aircraft. It is therefore imperative that the strain on the rivets be regularly and accurately measured in order to detect failures thereof before they occur, so that the aircraft can be taken out-of-service for the necessary repairs. Obviously, the older the aircraft, the more frequently such strain measurements need to be made, as the likelihood and incidence of fastener failure due to corrosion and metal fatigue increases as a function of time.

A fiber-optic strain sensor has been recently developed by Fiso Technologies, Inc. (Quebec, Canada) which is perfectly linear, can be thermally self-compensated, is not sensitive to transverse strain, and which provides precise, absolute, and stable measurements over long periods of time. This fiber-optic strain sensor is disclosed in U.S. Pat. No. 5,202,939, the disclosure of which is incorporated herein by reference, and in an article entitled "White-Light Interferometric Multimode Fiber-Optic Sensor", Optics Letters, pp,. 78–80 (1993), the disclosure of which is also incorporated herein by reference. This fiber-optic sensor includes a fiber-optic strain gauge which can be embedded into the structure being monitored, e.g., in a bore drilled into a fastener. Such a fiber-optic strain gauge 20 is depicted in FIG. 1.

With reference to FIG. 1, the fiber-optic strain gauge 20 is constructed by inserting a pair of multimode optical fibers 22 into opposite ends of a quartz microcapillary 24. The tips of the multimode optical fibers 22, which form a Fabry-Perot cavity 23, are adjusted to a given cavity length. The optical fibers 22 are then fused directly to the quartz microcapillary 24, the sensitivity being determined by the distance between the welding spots 26, 28, which distance will hereinafter be referred to as the "gauge length" and the region between the welding spots 26, 28 will hereinafter be referred to as the "gauge length region".

When embedded in the structure being monitored, the elongation of the gauge 20 within the gauge length region is completely converted into cavity-length elongation. Thus, the cavity length (i.e., the length of the Fabry-Perot cavity 23) is directly proportional to the strain on the structure being monitored. In the known fiber-optic strain sensor, the fiber-optic strain gauge 20 is coupled to a white light interferometric cavity length measurement system by means of fiber-optic cabling. With this arrangement, the strain on the structure being monitored can be continuously detected by means of the white light interferometric cavity length measurement system. An exemplary white light interferometric cavity length measurement system (referred to as a "white-light cross-correlator") is disclosed in U.S. Pat. No. 5,392,117, the disclosure of which is incorporated herein by reference, and is commercially available as the Fiso Technologies" FTI-100i Series of fiber-optic sensors. The FTI-100i instrument is capable of measuring the absolute Fabry-Perot cavity length of fiber-optic Fabry-Perot strain gauges with a high degree of accuracy, providing highly accurate and reliable measurements.

A large number of such fiber-optic strain sensors can be integrated into a large structure in order to continuously provide information on the state of the structure. A structure equipped with such an integrated network of fiber-optic strain sensors can be thought of as an "intelligent (or smart) structure". Potentially, this technology can be utilized in an aircraft to very accurately and reliably measure the strain on thousands of rivets, screws, bolts, and other fasteners over the lifetime of the aircraft. However, the known fiber-optic strain sensors require that the fiber-optic cabling be routed throughout the entire aircraft to couple each of the thousands of fiber-optic strain sensors to the white light interferometric cavity length measurement system ("reading head"). Consequently, the cost of installation and maintenance of such a fiber-optic strain measurement system would be prohibitively high for this application. Thus, there presently exists a need in the art for a fiber-optic strain measurement technique which overcomes this fundamental shortcoming of the presently available technology. The present invention fulfills this need in the art.

SUMMARY OF THE INVENTION

The present invention encompasses a method for measuring strain on a structure having a bore and an untethered fiber-optic strain gauge embedded in the bore, which includes the steps of inserting a coupler portion of a fiber-optic cable into the bore in operative relationship to the fiber-optic strain gauge, and using an optical cavity length measurement device attached to the distal end of the fiber-optic cable to measure the strain on the structure. The coupler portion of the fiber-optic cable is removed from the bore after the strain on the structure has been measured. In an illustrative embodiment, the structure is a fastener, e.g., a rivet, used to join together the aluminum skin and the airframe of an aircraft, the bore being provided coincident with the central, longitudinal axis of the rivet.

The present invention also encompasses the structure provided with the bore having an untethered fiber-optic strain gauge embedded therein.

BRIEF DESCRIPTION OF THE DRAWINGS

These and other objects, features, and advantages of the present invention will become apparent from the following detailed description read in conjunction with the accompanying drawings, in which.

DETAILED DESCRIPTION OF THE INVENTION

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the present invention would be of significant utility.

Figure 2:
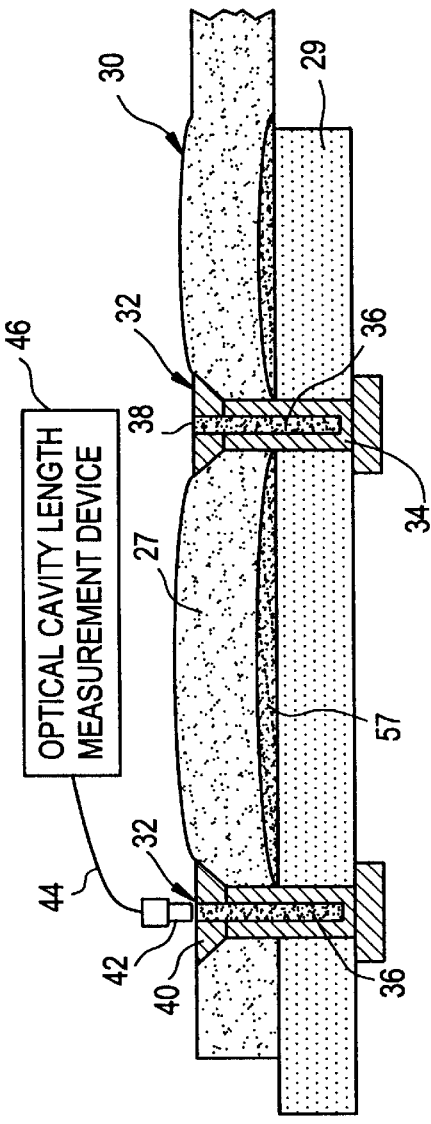
FIG. 2 is a partially schematic, partially cross-sectional view of a structure which is provided with fasteners equipped with an untethered fiber-optic strain gauge in accordance with a preferred embodiment of the present invention; and, FIG. 3 is a plan view of the head of a fastener constructed in accordance with a preferred embodiment of the present invention.

With reference now to FIG. 2, there can be seen a two layers 27, 29 of a structure 30 fastened together by fasteners 32 constructed in accordance with a preferred embodiment of the present invention. The layers 27, 29 can suitably be the aluminum skin and the airframe, respectively, of an aircraft, and the fasteners 32 can suitably be rivets, although the invention is, of course, not limited thereto.

Figure 1:
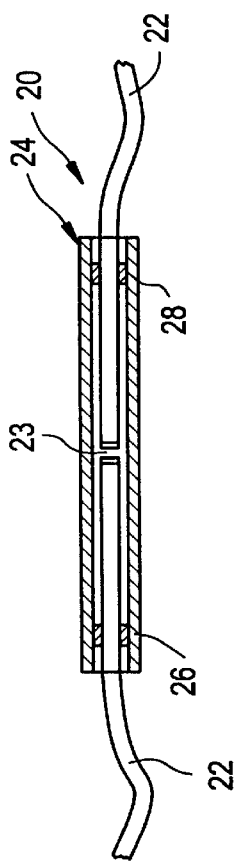
FIG. 1 is a cross-sectional view of a known multimode extrinsic Fabry-Perot fiber-optic strain gauge.

In accordance with the present invention, each of the fasteners 32 is provided with a bore 34 which is preferably aligned with the neutral (e.g., central) axis thereof, and a fiber-optic strain gauge 36 inserted or embedded within the bore 34. The fiber-optic strain gauges 36 are preferably of the type depicted in FIG. 1 and described hereinabove. Each of the fiber-optic strain gauges 36 is preferably embedded within the bore 34 of the respective fastener 32 to a depth sufficient to form a recess 38 in the head 40 of the respective fastener 32. The fiber-optic strain gauges 36 can be secured into the bores 34 of the respective fasteners 32 by being press-fit, epoxied in place, or by using any other convenient fabrication technique. The recess 38 is adapted to snugly receive a male coupler 42 provided at one end of a fiber-optic cable 44 whose other (distal) end is coupled to an optical cavity length measurement device 46, such as the white light interferometric cavity length measurement device disclosed in U.S. Pat. No. 5,392,117. Alternatively, a broadband (e.g. LED)-based absolute optical cavity length measurement device of the type manufactured and sold by Fiber and Sensors Technologies (F&S Technologies—Blacksburg, Va.) can be employed.

Figure 3:
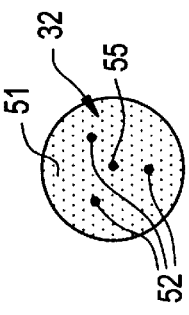

It should be appreciated that the present invention can be practiced by retrofitting existing fasteners with an embedded fiber-optic strain gauge, or by originally manufacturing or fabricating fasteners with an embedded fiber-optic strain gauge. In any event, with the exemplary embodiment described above, field service personnel can easily monitor the strain on each of the fasteners 32 by simply inserting the male coupler 42 into the recess 38 formed in the head 40 thereof, and then utilizing the optical cavity length measurement device 46 in the normal manner. For example, the FTI-100I instrument mentioned previously provides a digital read-out of the measured strain. In order to simplify this process, the diameter of the fiber-optic strain gauge 36 and the diameter of the fiber-optic cable 44 can be made relatively large, e.g., approximately 1 mm. Further, with reference now to FIG. 3, the upper face 51 of each of the fasteners 32 is preferably provided with a plurality (e.g., three) alignment index marks (e.g., indents) 52 to facilitate easy and rapid alignment of the coupler 42 with the recess 38. The upper facet 55 of the fiber-optic strain gauge 36 can be roughly centered between the alignment index marks 52, although this is, of course, not limiting to the invention.

It will be readily appreciated that in the exemplary embodiment depicted in FIG. 2 and discussed above, the aluminum skin 27 is susceptible to corrosion, which is manifested as a build-up of aluminum oxide 57 between the aluminum skin 27 and the airframe 29. Because aluminum oxide requires six times the volume that aluminum does, the aluminum oxide 57 induces bowing of the aluminum skin 27, which in turn puts a significant strain on the heads 40 of the rivets 32. Of course, the precise strain on each of the rivets 32 can be quickly and easily determined by merely plugging the coupler 42 of the fiber-optic sensing cable 44 into the corresponding recess 38, and then using the optical cavity length measurement system 46 to read the strain value.

Although the present invention was described above in connection with an illustrative application, it will be readily appreciated by those skilled in the pertinent art that the present invention can be used in many other applications. For example, in addition to any type of fastener, fiber-optic strain gauges can be embedded in any solid, cast, or machined part, e.g., propellers, turbine blades, metal beams and plates, etc., of any size or shape, (e.g., straight-sided or curved), and made of any material (e.g., a composite, plastic, metal, ceramic, or other material). For example, it would be possible to measure the tangential strain on a drive shaft, or to measure the strain on the airframe structure directly (as opposed to the strain on the fasteners used to fasten the skin to the airframe). Moreover, it will be readily appreciated by those skilled in the pertinent art that the present invention can be utilized to measure the strain on a suitably-equipped structure during the construction or fabrication of the structure, rather than during periodic inspections after the structure is built, in order to provide useful information (in real-time) which can be advantageously utilized in making any adjustments which may be required to ensure that the measured strain is kept within prescribed tolerances.

The present invention provides several advantages and benefits, including, but not limited to, those enumerated below:

1) several orders of magnitude of cost savings are realized by not permanently attaching the fiber-optic strain gauges to the fiber-optic cabling for coupling to the optical cavity length measuring system—the difficulty, cost, and time required for installation are much less than would be the case if it were required to route the fiber-optic coupling cable to each of the hundreds or thousands of fiber-optic strain gauges and back to the optical cavity length measurement system;

2) the fiber-optic strain gauges will not affect the structural integrity of the fasteners or the structure held together by the fasteners;

3) it can be used to measure strain in a part of any size or shape, even curved holes;

4) it is not temperature-limited. The fiber-optic strain gauges can be made out of sapphire which is rated well above 1,100° C.; and, 5) hundreds or thousands of sensors can be embedded in a structure to provide a mechanically intelligent structure.

Although the present invention has been described in detail hereinabove in connection with a presently preferred embodiment, it should be clearly understood that many variations and/or modifications of the basic inventive concepts taught herein which may appear to those skilled in the pertinent art will still fall within the spirit and scope of the present invention as defined in the appended claims.

What is claimed is:

1. A structure, including:

a bore provided in the structure;

an untethered fiber-optic strain gauge embedded in the bore; and means for facilitating the removable coupling of a fiber-optic cable to the structure in operative relationship to the fiber-optic strain gauge, wherein the fiber optic cable is attached at its distal end to an optical cavity length measurement device.

2. The structure as set forth in claim 1, wherein the means for facilitating comprises a recess formed between an upper face of the fiber-optic strain gauge and an upper end portion of the structure, wherein the recess is adapted to be removably coupled to a fiber-optic cable.

3. The structure as set forth in claim 1, wherein:

the fiber-optic strain gauge comprises a multimode fiber-optic Fabry-Perot strain gauge; and, the optical cavity length measurement device comprises a white light interferometric cavity length measurement device.

4. The structure as set forth in claim 1, wherein:

the fiber-optic strain gauge comprises a multimode fiber-optic Fabry-Perot strain gauge; and, the optical cavity length measurement device comprises a broadband interferometric cavity length measurement device.

5. The structure as set forth in claim 1, wherein the structure comprises a fastener.

6. The structure as set forth in claim 1, wherein the structure comprises:

a first layer;

a second layer;

a fastener joining the first and second layers; and, wherein the bore is provided in the fastener.

7. The structure as set forth in claim 6, wherein the bore is coincident with a central axis of the fastener.

8. The structure as set forth in claim 7, wherein the fastener comprises a rivet.

9. The structure as set forth in claim 6, wherein the first layer comprises an airframe member, and the second layer comprises an aluminum layer.

10. The structure as set forth in claim 5, wherein the fastener includes an upper face having at least one alignment index mark for facilitating alignment of a fiber-optic cable with the bore.

11. The structure as set forth in claim 5, wherein the fastener includes an upper face having a plurality of alignment index marks for facilitating alignment of a fiber-optic cable with the bore.

12. The structure as set forth in claim 1, further including alignment means for facilitating the alignment of a fiber-optic cable with the bore.

13. The structure as set forth in claim 1, wherein the optical cavity length measurement device is selectively operable to provide a visual indication of a level of strain on the fastener, including strain induced by bowing of the aluminum layer due to corrosion.

14. A method for measuring strain on a structure having a bore and an untethered fiber-optic strain gauge embedded in the bore, including the steps of:

inserting a coupler portion of a fiber-optic cable into a bore in operative relationship to the fiber-optic strain gauge, wherein the fiber optic cable is attached at its distal end to an optical cavity length measurement device;

using the optical cavity length measurement device to measure the strain on the structure; and removing the coupler portion of the fiber-optic cable from the bore after measuring the strain on the structure.

15. The method as set forth in claim 14, wherein the structure comprises a fastener.

16. The method as set forth in claim 14, wherein the structure comprises:

a first layer;

a second layer;

a fastener joining the first and second layers; and, wherein the bore is provided in the fastener.

17. The method as set forth in claim 16, wherein the first layer comprises an airframe member, and the second layer comprises an aluminum layer.

* * * * *